(12) United States Patent
Krishnan et al.

(10) Patent No.: US 10,524,103 B2
(45) Date of Patent: Dec. 31, 2019

(54) LOCATING USER DEVICES IN ENTERPRISES

(71) Applicant: Avaya Inc., Santa Clara, CA (US)

(72) Inventors: Parameshwaran Krishnan, Basking Ridge, NJ (US); Navjot Singh, Somerset, NJ (US)

(73) Assignee: AVAYA INC., Santa Clara, CA (US)

( * ) Notice: Subject to any disclaimer, the term of this patent is extended or adjusted under 35 U.S.C. 154(b) by 0 days.

(21) Appl. No.: 15/096,981

(22) Filed: Apr. 12, 2016

(65) Prior Publication Data

US 2017/0295480 A1 Oct. 12, 2017

(51) Int. Cl.
*H04W 4/90* (2018.01)
*H04B 5/00* (2006.01)
*H04W 4/80* (2018.01)
*H04W 4/029* (2018.01)

(52) U.S. Cl.
CPC ............ *H04W 4/90* (2018.02); *H04B 5/0031* (2013.01); *H04W 4/029* (2018.02); *H04W 4/80* (2018.02)

(58) Field of Classification Search
CPC ......... H04W 4/22; H04W 4/02; H04W 4/008; H04B 5/0031
See application file for complete search history.

(56) References Cited

U.S. PATENT DOCUMENTS

| 2011/0291884 | A1* | 12/2011 | Oh ......................... G01S 19/48 342/357.31 |
| 2013/0314210 | A1* | 11/2013 | Schoner ............. G06K 7/10366 340/8.1 |
| 2016/0381537 | A1* | 12/2016 | R ........................... H04W 4/22 455/404.1 |
| 2017/0332341 | A1* | 11/2017 | Aggarwal ............ H04W 24/08 |

* cited by examiner

*Primary Examiner* — Marcos L Torres

(57) ABSTRACT

A device, system, and method locates user devices in enterprises. The method performed by an enterprise server of an enterprise includes receiving contact data from an emergency services device, the contact data comprising location related data of a user device and identification data of the user device. The method includes determining if a general location data of the user device is associated with an area data of the enterprise as a function of the location related data. The method includes determining a precise location data of the user device within the area data of the enterprise based on the contact data.

16 Claims, 6 Drawing Sheets

LOCATING USER DEVICES IN ENTERPRISES

BACKGROUND

A user device may be configured to connect to a variety of different wireless networks based on the hardware and software configurations thereof. For example, the user device may be able to connect to a cellular network and/or a WiFi network, depending on how the user device is configured. While connected to a wireless network, the user device may execute a call application in which a voice call may be performed. A specific implementation of the voice call is an emergency call placed by a mobile user device in which the call is routed to a Public-Safety Answering Point (PSAP).

When the call is established with the PSAP, the user device may be geographically located using a variety of different location mechanisms. For example, if the user device is connected to a cellular network, the service provider of the cellular network may triangulate the user device using signal strength to one or more cellular towers. Thus, an initial process may be to identify the caller identification and connected cellular tower and a subsequent process may be to determine the geographic location of the user device (e.g., latitude and longitude within 300 meters). The user device may be provided this location to be forwarded to the PSAP or the PSAP may receive this location from the cellular service provider. However, using only cellular signals leaves a relatively large margin of error to locate the user device. In another example, if only WiFi signals are used to determine the location of the user device, the user device may identify the various WiFi networks broadcasting their identity at the location of the user device. Based upon known locations of the WiFi networks, the user device may estimate the location of the user device. Specifically, the known locations of the WiFi networks may be from the use of streetview cars and specially equipped trucks that captured WiFi network identifiers. However, using only WiFi signals also leaves a relatively large margin of error to locate the user device. In a further example, to provide a more refined location of the user device with a smaller margin of error, the location mechanism may combine various different location mechanisms such as cellular signals, WiFi signals, global positioning signals, etc.

Although the location mechanisms may be used in locating the user device, the location of the user device is generally in an area (with a margin of error) and only at a two-dimensional geographic location. However, the call may be originating from a user device in an enterprise (e.g., an office building, a campus, a building within the campus, etc.). If the user device is not on a system (e.g., wireless) of the enterprise, the enterprise may be completely unaware that the emergency call has been placed from within the enterprise. While the two-dimensional geographic location may provide a general location for emergency services to be dispatched to the enterprise, upon arrival, the location of the user device inside the building or campus may pose difficulties, particularly without support from the enterprise.

BRIEF SUMMARY

The exemplary embodiments are directed to a method, comprising: receiving, by an enterprise server of an enterprise, contact data from an emergency services device, the contact data comprising location related data of a user device and identification data of the user device; determining, by the enterprise server, if a general location data of the user device is associated with an area data of the enterprise as a function of the location related data; and determining, by the enterprise server, a precise location data of the user device within the area data of the enterprise based on the contact data.

DETAILED DESCRIPTION

Figure 1:
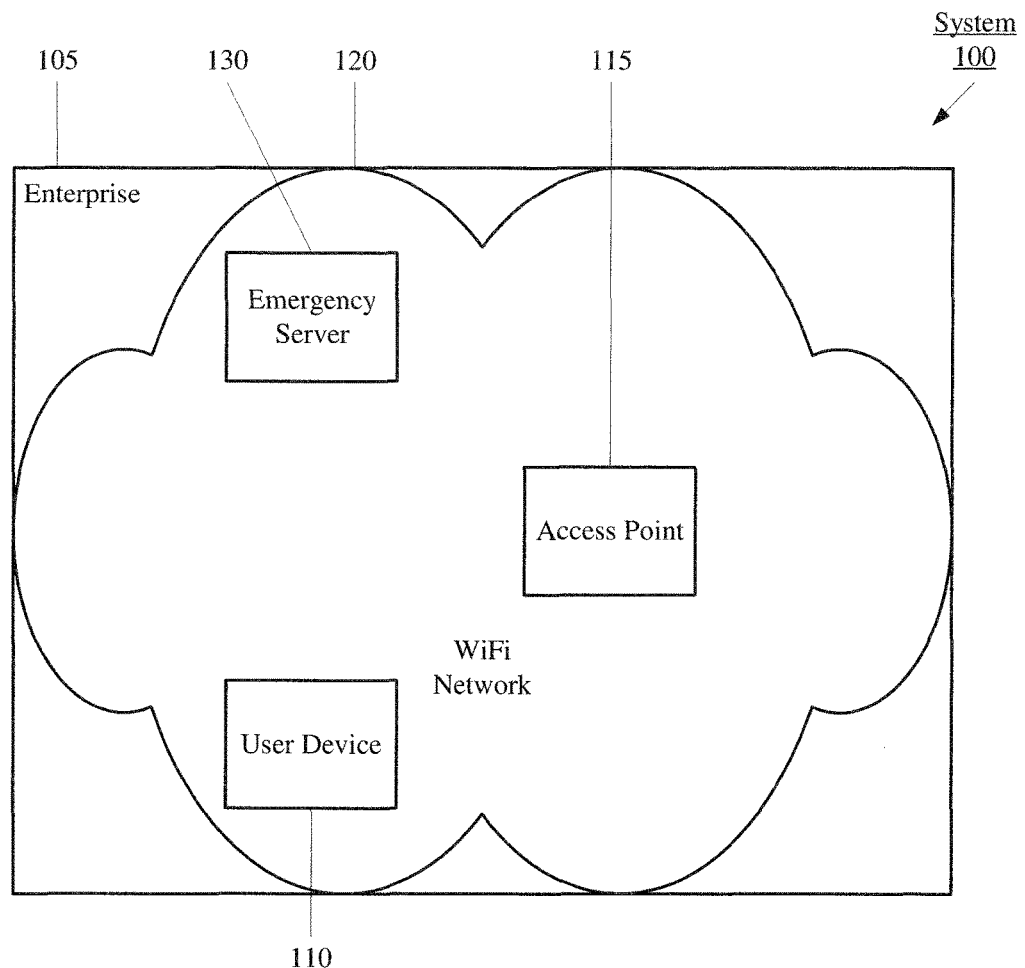
FIG. 1 shows an exemplary system according to the present disclosure.
Figure 1:

The exemplary embodiments may be further understood with reference to the following description and the related appended drawings, wherein like elements are provided with the same reference numerals. The exemplary embodiments are related to a device, a system, and a method for locating a user device who has contacted a Public-Safety Answering Point (PSAP) while inside an area associated with an enterprise. The exemplary embodiments are directed to a cooperative mechanism in which the enterprise and the PSAP coordinate efforts to identify a precise location of the user device in the enterprise. Specifically, a prearranged agreement between the PSAP and the enterprise enables a general location of the user device to be determined, the general location being indicative of the enterprise, and the precise location of the user device within the enterprise to be determined and provided to the PSAP for emergency services to be dispatched.

The exemplary embodiments provide a mechanism that enables a PSAP who has received a contact from a user device to determine a location within an enterprise for emergency services to be dispatched to the location. For example, the enterprise may be a building and the location may specify which floor and/or room in the building that the user device is located. The PSAP may receive contact data of the user device which enables the PSAP to determine the general location of the user device where the general location is a substantially two dimensional geographic location. The PSAP may also determine that the general location corresponds to the enterprise. Using the prearranged agreement, the PSAP may contact the enterprise with the contact data. The enterprise may verify that the user device is indeed in the enterprise and then determine the precise location of the user device within the enterprise. The enterprise may provide this precise location to the PSAP through the contact that was established. The enterprise may also notify security or an administrator of the enterprise that the user device in the enterprise has contacted the PSAP. In this manner, the PSAP may dispatch emergency services to the user device within the enterprise.

FIG. 1 shows an exemplary embodiment of a system 100 according to the present disclosure. The system 100 may represent an enterprise 105 in which a user device 110 may be disposed in an area of the enterprise 105. Although the term "area" is used, as will be described in further detail below, the area of the enterprise 105 may refer generally to any part of a geographic area and/or an elevation in a building of the enterprise. The system 100 may include a first component that enables a general location to be determined. Specifically, the system 100 may include a cellular tower 125. The system 100 may also include further components that enable a precise location to be determined within the enterprise 105. Specifically, the system 100 may include a WiFi network 120 provided by an access point 115. As will be described in further detail below, the enterprise 105 may further include an emergency server 130 that coordinates efforts to determine the precise location and provide the precise location to an emergency services entity. Specifically, as illustrated, the emergency services entity may be a PSAP 150.

The enterprise 105 may be any location having an area managed by administrators of the enterprise 105. For example, the enterprise 105 may be a campus including a plurality of buildings, a building including a plurality of floors, a floor including a plurality of rooms, a combination thereof, etc. The enterprise 105 may occupy a two-dimensional area with respect to map data where the map data may be indicative of a conventional representation of a map for a geographical area. For example, the enterprise 105 may have a two-dimensional area being a rectangular shape where each corner is represented with a latitude/longitude pair. In another example, the enterprise 105 may be the campus or building where a center of the enterprise 105 is represented with a point (e.g., a latitude/longitude pair) and the two-dimensional area is circle having a radius extending from the point. In a further example, the enterprise 105 may have a two-dimensional area that is of any shape, may have a plurality of two-dimensional areas that are separate from one another, etc. Thus, when a location in the map data is received and is within the two-dimensional area of the enterprise 105, the enterprise 105 may be identified. The two-dimensional area of the enterprise 105 will be described in further detail below with respect to FIG. 2. The enterprise 105 may further have a three-dimensional volume when an elevation is involved in the two-dimensional area (e.g., a floor of a building). The three-dimensional volume of the enterprise 105 may be associated with the two-dimensional area which is known and utilized by the enterprise 105. The three-dimensional volume of the enterprise 105 will be described in further detail below with respect to FIG. 3.

The user device 110 may be any electronic device disposed in the two-dimensional area of the enterprise 105 utilized by a user who is present in the two-dimensional area of the enterprise 105. The user device 110 may include a plurality of components and have a plurality of applications installed thereon for various functionalities, features, and operations to be performed manually by the user or automatically by the user device 110. Specifically, the user device 110 may be a portable device such as a tablet, a smartphone, a laptop, a wearable, etc. Accordingly, the user device 110 may include a processor, a memory arrangement, a display device, an input/output (I/O) device, a transceiver, an audio device, and other components (e.g., an imager, a battery, a data acquisition device, ports to electrically connect the user device 110 to other electronic devices, etc.). The processor may provide conventional functionalities such as executing applications installed and stored in the memory arrangement. The display device, the I/O device, the audio device, etc. may also provide conventional functionalities ordinarily associated with these components. The transceiver may provide a conventional functionality to establish a connection between the user device 110 and a further electronic device or network. While connected, data may be exchanged with the further electronic device or network. The transceiver of the user device 110 may operate on a variety of different frequencies or channels (e.g., set of consecutive frequencies) such as a cellular frequency, a WiFi frequency, a HotSpot frequency, a BlueTooth frequency, a near field communications (NFC) frequency, etc.

As noted above, the processor of the user device 110 may be configured to execute a plurality of applications. In a specific example utilized for the exemplary embodiments, the processor of the user device 110 may be configured to execute a communications functionality. The communications functionality may be a call application (e.g., to establish a voice communication), a chat application (e.g., to establish a chat communication), a video application (e.g., to establish a video communication), etc. More specifically and as will be described in further detail below, the communications functionality may relate to an emergency communications with the PSAP 150.

In another specific example utilized for the exemplary embodiments, the processor of the user device 110 may be configured to execute a location functionality. The location functionality may be any mechanism in which the location of the user device 110 or data related to the location of the user device 110 is generated. Specifically, the location of the user device 110 may be the two-dimensional location of the user device 110. For example, the location functionality may be a latitude/longitude pair. In another example, the location functionality may utilize signal information (e.g., signal strength from the cellular tower 125, detected WiFi networks, etc.) to estimate the location of the user device 110. The data related to the location may be any of the information in determining the location of the user device 110 (e.g., the signal information). As will be described in further detail below, the location or the data related to the location of the user device 110 may be embodied as contact data when performing the emergency communications with the PSAP 150.

It should be noted that the above noted applications each being an application (e.g., a program) executed by the processor is only exemplary. The functionality associated with the applications may also be represented as components of one or more multifunctional programs, a separate incorporated component of the user device 110 or may be a modular component coupled to the user device 110, e.g., an integrated circuit with or without firmware.

The access point 115 may be any component capable of providing the WiFi network 120. For example, the access point 115 may be a router, a server, a network management arrangement, etc. The access point 115 may be at a center of the WiFi network 120 that has a wireless broadcast area extending from the access point 115. However, the disposition of the access point 115 at a center of the broadcast area is only exemplary. Those skilled in the art will understand that the access point 115 may be located at any position relative to the broadcast zone of the WiFi network 120.

It should be noted that the description herein relates to the enterprise 105 utilizing the access point 115 to provide a WiFi network 120. However, the use of the access point 115 and the WiFi network 120 is only exemplary. According to the exemplary embodiments, the enterprise 105 may create any type of wireless network for the user device 110 to connect or discover. For example, the enterprise 105 may have BlueTooth transceivers or NFC beacons disposed at various locations throughout the enterprise 105. In another example, the enterprise 105 may utilize a cellular network using a cellular tower. In a further example, the enterprise 105 may utilize a HotSpot network. Accordingly, the access point 115 may represent any component configured to create the respective type of wireless network which is represented as the WiFi network 120.

It should also be noted that the WiFi network 120 of the enterprise 120 may utilize an association procedure. Specifically, the user device 110 may establish a connection with the WiFi network 120 using a handshake procedure or a substantially similar procedure. During the association procedure, the user device 110 may also be authenticated to join the WiFi network 120 using authentication data. The authentication data may be any type of data that is transmitted from the user device 110 to the access point 115 (e.g., login credentials, a password, etc.). In a specific example, the user device 110 may provide a media access control (MAC) address and/or a phone number associated with the user device 110. The access device 115 may store this authentication data while the user device 110 remains connected to the WiFi network 120.

The system 100 illustrated in FIG. 1 shows the WiFi network 120 being provided by the access point 115. That is, a single WiFi network 120 is provided by a single access point 115. However, it should be noted that this configuration is only exemplary. Specifically, the access point 115 may represent an arrangement of one or more access points while the WiFi network 120 may represent an arrangement of one or more WiFi networks. As will be described in further detail below with respect to FIG. 2, the enterprise 105 may include a plurality of WiFi networks 120 provided by a respective plurality of access points 115 distributed throughout the two-dimensional area of the enterprise 105. As will also be described in further detail below with respect to FIG. 3, the enterprise 105 may include a plurality of WiFi networks 120 provided by a respective plurality of access points distributed throughout the three-dimensional volume in a given portion of the two-dimensional area of the enterprise 105.

The two-dimensional area of the enterprise 105 may also have further wireless networks available therein. That is, the enterprise 105 may have wireless networks that are not associated with the enterprise 105 that are available in the two-dimensional area of the enterprise 105. Specifically, a cellular network provided by the cellular tower 125 may be available in the enterprise 105. Those skilled in the art will understand that a cellular network may extend a significant broadcast zone from the cellular tower 125. Accordingly, the cellular network may also be available to the user device 110 which is located in the two-dimensional area of the enterprise 105.

It should be noted that the system 100 includes a single cellular tower 125 to provide the cellular network. However, this configuration for the cellular network being provided by the cellular tower 125 is only exemplary. Substantially similar to the access point 115, the cellular tower 125 may represent an arrangement of one or more cellular towers that provide the cellular network.

It should also be noted that the system 100 may include further wireless networks in the two-dimensional area of the enterprise 105. For example, one or more other WiFi networks associated with another enterprise or other entity as well as one or more other cellular networks different from the cellular network provided by the cellular tower 125 may extend into the two-dimensional area of the enterprise 105.

Accordingly, the user device 110 may establish a connection or discover the WiFi network 120, the cellular network provided by the cellular tower 125, and the further wireless networks.

As described above, a specific type of communication using the communications functionality of the user device 110 is the emergency communication with the PSAP 150. In many countries, the public telephone network has a single emergency telephone number (e.g., "911" in North America, "112" in European countries, etc.) that allows a caller to contact emergency services for assistance. Thus, when the caller inputs the emergency telephone number into the call application of the user device 110, a voice call may be routed to the PSAP 150. The PSAP 150 is a contact center responsible for answering communications to an emergency telephone number for police, firefighting, ambulance services, and other emergency services. It is noted that the use of the call application to contact the PSAP 150 is only exemplary. The PSAP 150 may be configured to receive communications over a variety of different communication channels including the voice call. As described above, the user device 110 may be configured to perform other communication functionalities such as a video call, a text communication, etc. The PSAP 150 may also be configured to receive communications over these types of communication channels. The PSAP 150 may also be configured to receive communications over non-real-time channels such as a webform although real-time channels are more often associated with use of the PSAP 150 due to the emergency nature of the communication. As will be described in further detail below, the PSAP 150 may perform the emergency communication with the user device 110 and receive the contact data from the user device 110 and/or other source (e.g., cellular provider associated with the cellular tower 125).

Those skilled in the art will understand that there is a plurality of PSAPs disposed in select geographic locations that handle the emergency communications that are performed within the respective geographic area assigned to the PSAPs. Accordingly, the PSAP 150 may represent the emergency contact for a geographic area including the enterprise 105 where a service area of the PSAP 150 incorporates the two-dimensional area of the enterprise 150. However, it is noted that another PSAP may also provide emergency services for the enterprise 105 if a service area of this other PSAP also extends over the two-dimensional area of the enterprise 150.

Figure 2:
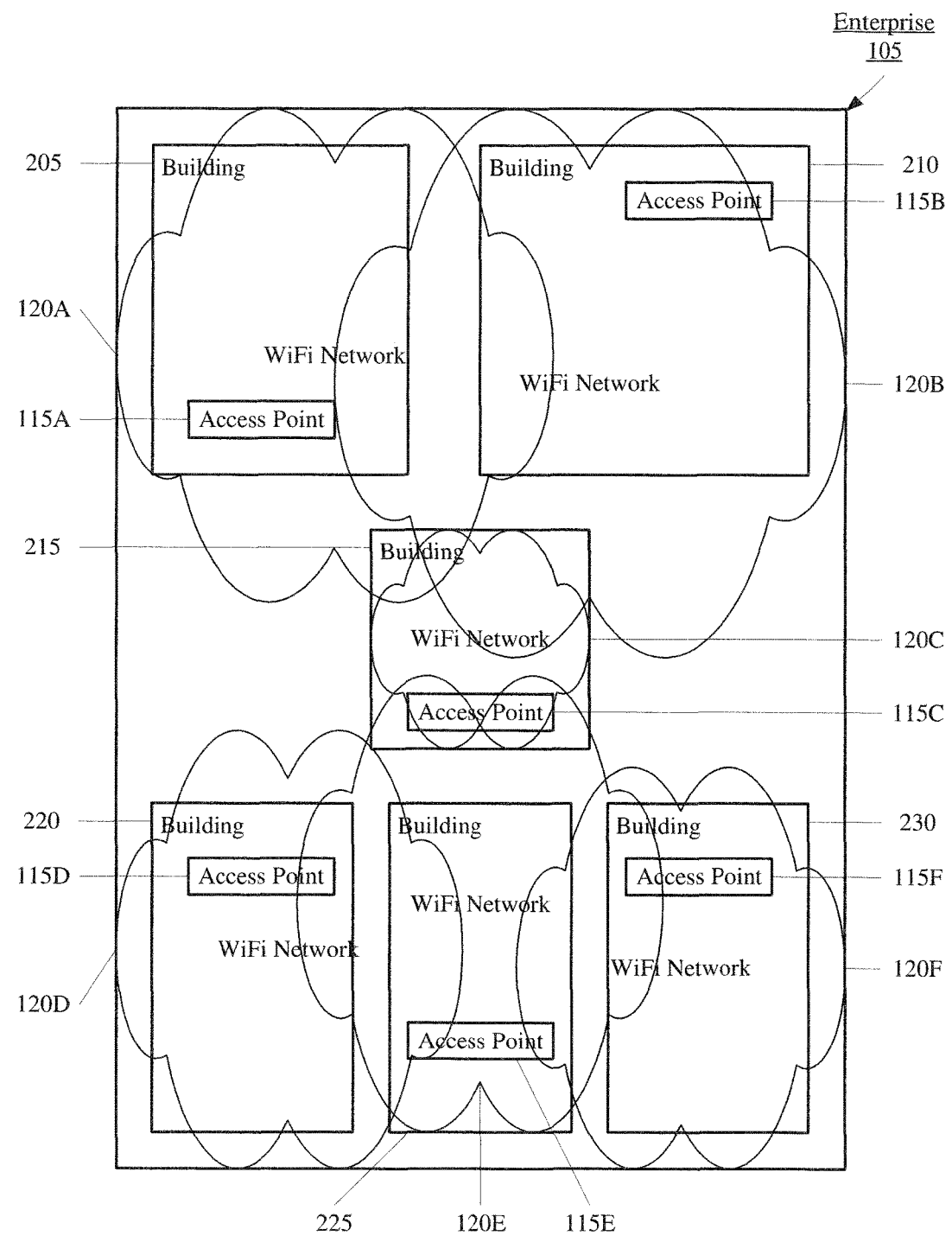
FIG. 2 shows a first exemplary arrangement of the enterprise of the system of FIG. 1 according to the present disclosure.

As described above, the enterprise 105 may be arranged in a variety of different arrangements including as a campus with multiple buildings, within a building, within a floor of a building, etc. FIG. 2 shows an exemplary embodiment of a two-dimensional area of the enterprise 105 of the system 100 of FIG. 1 according to the present disclosure. As shown, the enterprise 105 may be a campus including a plurality of buildings 205-230. The buildings 205-230 may be arranged in any manner such as the configuration shown in FIG. 2. As described above, each of the buildings 205-230 may include a portion of the WiFi network 120. Specifically, the building 205 may include an access point 115A which provides a WiFi network 120A, the building 210 may include an access point 115B which provides a WiFi network 120B, the building 215 may include an access point 115C which provides a WiFi network 120C, the building 220 may include an access point 115D which provides a WiFi network 120D, the building 225 may include an access point 115E which provides a WiFi network 120E, and the building 230 may include an access point 115F which provides a WiFi network 120F. Thus, in a manner consistent with an exemplary embodiment described above, the access point 115 and the WiFi network 120 shown in the system 100 of FIG. 1 may include a plurality of access points 115A-F and a plurality of WiFi networks 120A-F, respectively.

The organization of the buildings 205-230 with the access points 115A-F and the WiFi networks 120A-F may provide an overall WiFi network 120 for the user device 110 that is within the two-dimensional area of the enterprise 105. For example, the user device 110 may be located in the building 205. While in certain parts of the building 205, the user device 110 may connect to or discover the WiFi network 120A. While in other parts of the building 205, the user device 110 may connect to or discover the WiFi network 120A and the WiFi network 120B. In another example, the user device 110 may be located in the building 215. While in a first part of the building, the user device 110 may connect to or discover the WiFi networks 120A, 120B, and/or 120C. While in a second part of the building, the user device 110 may connect to or discover the WiFi networks 120C and/or 120E. Therefore, the user device 110 may discover the WiFi networks 120A-F or perform an association procedure to connect to the WiFi networks 120A-F. It is again noted that the association procedure may entail the user device 110 transmitting data thereof such as a MAC address, a phone number, etc.

The user device 110 may also determine and store a signal strength corresponding to the discovered WiFi network. As noted above, the signal strength of the WiFi network may be associated with the contact data. Furthermore, as described above, while in the enterprise 105, the user device 110 may be connected to the cellular network provided by the cellular tower 125 that may encompass the two-dimensional area of the enterprise 105. The signal strength of the cellular network may also be determined and stored.

The arrangement of the two-dimensional area of the enterprise 105 shown in FIG. 2 includes a plurality of buildings 205-230 with each of the buildings 205-230 having a respective WiFi network 120A-F and access point 115A-F. However, it should be noted that this arrangement and ratio of components is only exemplary. For example, the building 225 may include the access point 115E that provides the WiFi network 120E. The WiFi network 120E may be configured to also extend to the buildings 220 and 230. That is, the buildings 220 and 230 may not have the access points 114D and 115F and the WiFi networks 120D and 120F. Therefore, a different ratio of components to buildings may be utilized by the enterprise 105. In another example, the building 215 may include the access point 1150 while the buildings 205, 210, 220, 225, and 230 have network amplifiers such that the WiFi network 120C extends to all the buildings 205-230. In this scenario, the WiFi network 120C may substantially correspond to the WiFi network 120 shown in the system 100 of FIG. 1. In a further example, the building 230 may be of a different shape (e.g., a substantially Y-shape). Accordingly, the access point 115F may represent an arrangement of one or more access points to provide the WiFi network 120F that represents one or more WiFi networks.

It should also be noted that the shape of the two-dimensional area of the enterprise 105 and the organization of the buildings 205-230 is only exemplary. As described above, the two-dimensional area of the enterprise 105 being a confined in a single geometric geographical area is only exemplary. In another exemplary embodiment, the two-dimensional area of the enterprise 105 may have a different geometric shape. In a further exemplary embodiment, the two-dimensional area of the enterprise 105 may be an arrangement of one or more two-dimensional areas separate from one another but associated with the enterprise 105.

Figure 3:
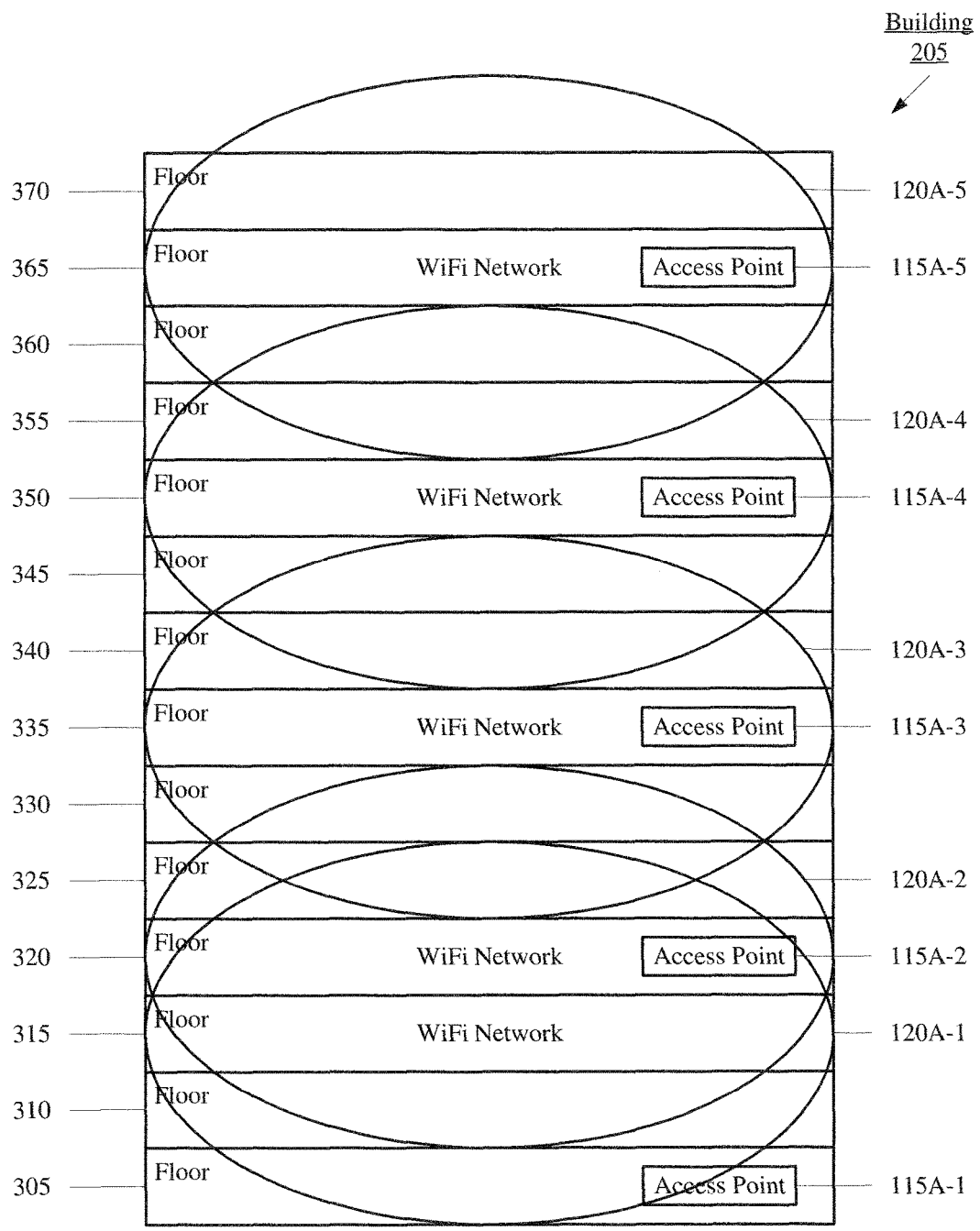
FIG. 3 shows a second exemplary arrangement of the enterprise of the system of FIG. 1 according to the present disclosure.

The above description related to FIG. 2 is directed to the two-dimensional area of the enterprise 105. However, as also described above, the enterprise 105 may have a three-dimensional volume at the two-dimensional area of the enterprise 105. FIG. 3 shows an exemplary embodiment of a three-dimensional volume of the enterprise 105 of the system 100 of FIG. 1 according to the present disclosure. Specifically, the three-dimensional volume may relate to the enterprise 105 including a building. Thus, the building 205 of the campus illustrated in the two-dimensional area of the enterprise 105 may have the three-dimensional volume. For exemplary purposes, the building 205 of the enterprise 105 is illustrated. However, each of the buildings 210-230 may also include a substantially similar organization and arrangement described herein.

In a substantially similar manner as the WiFi network 120 including a plurality of WiFi networks 120A-F, each of the WiFi networks 120A-F in the buildings may also include a plurality of WiFi networks. With the building 205, the access point 115A may be an arrangement of one or more access points and the WiFi network 115A may be an arrangement of one or more WiFi networks. Specifically, the building 205 may include the access point 115A which includes access points 115A-1, 115A-2, 115A-3, 115A-4, and 115A-5 and the WiFi network 120A which includes WiFi network 120A-1, 120A-2, 120A-3, 120A-4, and 120A-5.

The building 205 may also include a plurality of floors 305-370 where each floor has at least one of the WiFi networks 120A-1 to 120A-5. As illustrated, the WiFi network 120A-1 may extend from the bottom floor 305 to the floor 325, the WiFi network 120A-2 may extend from the floor 310 to the floor 330, the WiFi network 120A-3 may extend from the floor 325 to the floor 345, the WiFi network 120A-4 may extend from the floor 340 to the floor 360, and the WiFi network 120A-5 may extend from the floor 355 to the top floor 370. Thus, if the user device 110 is in the building 205 on a given floor, the user device 110 may be capable of connecting to or discovering the WiFi networks 120A-1 to 120A-5. Therefore, the user device 110 may discover the WiFi networks 120A-1 to 120A-5 or perform an association procedure to connect to the WiFi networks 120A-1 to 120A-5. It is again noted that the association procedure may entail the user device 110 transmitting data thereof such as a MAC address, a phone number, etc.

In a substantially similar manner when a plurality of buildings are involved, the user device 110 may also determine and store a signal strength corresponding to the discovered WiFi network while in the building 205. As noted above, the signal strength of the WiFi network may be associated with the contact data. Furthermore, as described above, while in the enterprise 105, the user device 110 may be connected to the cellular network provided by the cellular tower 125 that may encompass the two-dimensional area of the enterprise 105. The signal strength of the cellular network may also be determined and stored.

It should again be noted that the use of the campus for the enterprise 105 is only exemplary. For example, the building 205 may represent the entirety of the enterprise 105. That is, the enterprise 105 may occupy only a single building. In another example, the building 205 may represent where the enterprise 105 is selectively located. That is, the enterprise 105 may occupy select floors of a single building (e.g., floors 335-350).

Figure 4:
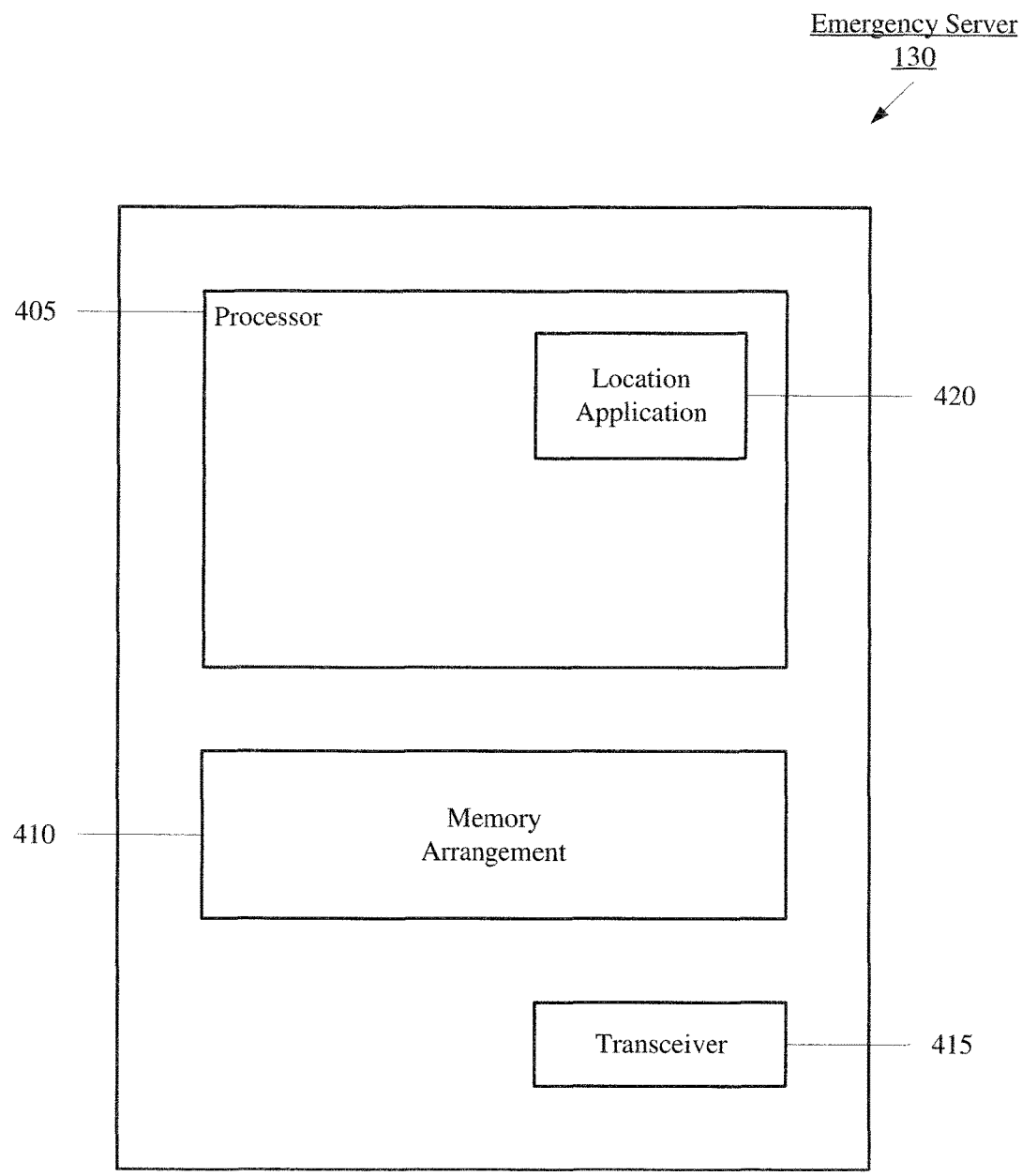
FIG. 4 shows an exemplary emergency server of the enterprise of the system of FIG. 1 according to the present disclosure.

Returning to the system 100 of FIG. 1, the enterprise 105 may further include an emergency server 130. The emergency server 130 may be a component of the enterprise 105 configured to cooperate with the PSAP 150 to aid in providing detailed information such as the precise location of the user device 110 for emergency services to be dispatched. FIG. 4 shows an exemplary embodiment of an emergency server 130 of the enterprise 105 of the system 100 of FIG. 1 according to the present disclosure.

The emergency server 130 may represent any electronic device that is configured to perform the functionalities and mechanisms described herein. As shown in FIG. 4, the emergency server 130 may include a processor 405, a memory arrangement 410, and a transceiver 415. The processor 405 may execute a plurality of applications, the memory arrangement 410 may store data related to the applications (e.g., performing the functionality of a read access memory (RAM)), and the transceiver 415 may exchange data with the user device 110 via the access point 115 and with the PSAP 150.

It should be noted that the emergency server 130 may also include further components such as a display device and an I/O device that enable an administrator to configure the emergency server 130 to perform its intended functionalities and mechanisms. However, it should also be noted that the emergency server 130 may be configured to receive these instructions via the transceiver 415 to automatically implement the policies upon reception. It should also be noted that the emergency server 130 is illustrated as being within the enterprise 105. However, the disposition of the emergency server 130 in the enterprise 105 is only exemplary. In another exemplary embodiment, the emergency server 130 may be disposed in any location (e.g., outside the venue 105).

The processor 405 may be configured to execute a location application 420. The location application 420 may be responsible for the operations performed by the enterprise 105 in cooperating with the PSAP 150. The emergency server 130 may be configured to communicate with the PSAP 150 to exchange data therebetween. The communication between the emergency server 130 and the PSAP 150 may be performed through any of the above identified types of communication channels using the transceiver 415. As will be described in detail below, based on data received from the PSAP 150 (e.g., the contact data the PSAP 150 received from the user device 110), the emergency server 130 may perform a plurality of operations. As will also be described in detail below, based on data received from the enterprise 105 (e.g., from the access point 115), the emergency server 130 may perform a further plurality of operations. The corresponding operations performed by the PSAP 150 will also be described below in relation to the operations performed by the enterprise 105.

An initial operation performed by the location application 420 is the pre-arranged agreement between the enterprise 105 and the PSAP 150. For example, the enterprise 105 may register with an emergency services organization in which the PSAP 150 is included. The registration process may be used to provide information to the PSAP 150 about the enterprise 105 and be included in a cooperative exchange for emergency services to be provided if a user device contacts the PSAP 150 while in the enterprise 105. During the registration process, the information provided by the enterprise 105 may include a contact mechanism for the PSAP 105 to contact the enterprise 105. For example, the enterprise 105 may provide a general telephone number, a specific telephone number (e.g., to a specific individual or department of the enterprise 105), an email, a server universal resource locator (URL), application program interfaces (APIs), etc. Thus, when the cooperative exchange for the emergency services is performed, the PSAP 105 may utilize the provided contact mechanism to reach the enterprise 105. The enterprise 105 may also provide location information. Specifically, the location information may be an approximate area in which the enterprise 105 is associated. For example, the location information may include the two-dimensional area of the enterprise 105. The location information may also be an approximate latitude/longitude pair indicating a center of the enterprise 105, a set of latitude/longitude pairs indicating the area of the enterprise 105, other geographic location indicators, etc. Accordingly, the PSAP 105 may be able to receive a location of the user device 110 and determine whether the user device 110 is located in the enterprise 105.

It should be noted that the registration procedure to establish the pre-arranged agreement may be a voluntary process performed by the enterprise 105. That is, the enterprise 105 may reach a website of the emergency services organization and register therewith. However, the voluntary nature and the enterprise 105 performing the active process of registering (whereas the emergency services organization plays a passive role) are only exemplary. For example, an enterprise may be required to register with the emergency services organization in a given location. In another example, the emergency services organization may contact the enterprise 105 to register the enterprise 105 therewith.

After the pre-arranged agreement has been established between the enterprise 105 and the PSAP 150, the mechanism according to the exemplary embodiments may be utilized to dispatch emergency services for a call originating from the user device 110 that is within the enterprise 105. Thus, an initial action is that the user utilizing the user device 110 contacts the PSAP 150 while in the enterprise 105. As noted above, the PSAP 150 may be contacted using a variety of different communication channels. For example, a voice application on the user device 110 may be used in which a contact number (e.g., 911 in the United States) is entered for the voice call to be routed to the PSAP 150. The user utilizing the user device 110 may accordingly communicate with an agent of the PSAP 150.

During the emergency communication between the user device 110 and the PSAP 150, the PSAP 150 may receive the contact data about the user device 110. As described above, the contact data may include a variety of different types of information. For example, the contact data may include information related to the general location of the user device 110. Specifically, the contact data may include signal information about connected or discovered networks. In another example, the contact data may include other information about the user or the user device 110. Specifically, the contact data may include the MAC address, the phone number, etc. of the user device 110. The PSAP 150 may receive the contact data from a variety of sources. For example, the information about the user or the user device 110 may be received from the user device 110 itself. In another example, the location information may be received from the user device 110 and/or the broadcaster of the signals being measured (e.g., cellular provider associated with the cellular tower 125).

When the PSAP 150 has received the contact data, the PSAP 150 may use location determining mechanisms to determine the general location of the user device 110. Initially, the user device 110 may be configured to determine its own location (e.g., an approximate latitude/longitude pair). The user device 110 may thereby provide an estimated location of the user device 110 to the PSAP 150 in the contact data. The broadcaster of the signals that are measured by the user device 110 may also determine an estimated location of the user device 110 and provide this information to the PSAP 150. Otherwise, using the location related information in the contact data, the PSAP 150 may determine the general location of the user device 110. For example, information about cellular networks and WiFi networks via corresponding signals (e.g., signal strength) may be used to determine the general location of the user device 110 (e.g., latitude/longitude pair). In another example, global positioning systems may be used to determine the general location.

When the general location of the user device 110 is known by the PSAP 150, the PSAP 150 may determine whether the user device 110 is within an enterprise location, particularly an enterprise that has a pre-arranged agreement with the emergency services organization associated with the PSAP 150. For example, the PSAP 150 may have map identification data that is accessible for use when the emergency communication is received. Initially, the map identification data may include map data. As noted above, map data may be indicative of a conventional representation of a map for a geographical area. The map identification data may also indicate whether an enterprise, a residence, a public zone, etc. is located at a certain area. The map identification data may further have an identification associated with the various types of places included in the map data of the map identification data. Thus, a general location may indicate whether the user device 110 is in a residence, a public zone, an enterprise, etc. and also identify the area (e.g., home owner of the residence, name of a park for a public zone, identity of the enterprise). It should be noted that the map identification data and the map data may not include a full or comprehensive listing of all areas therein. Thus, the identity of the area may not be available.

If the identity of the area is unavailable or if the general location is a public zone or residence, the PSAP 150 may forward the general location to an appropriate emergency services department based upon information received through the emergency communication (e.g., vocal information provided by the user of the user device 110). Accordingly, the emergency services may be dispatched to the general location identified for the user device 110.

According to the exemplary embodiments, if the PSAP 150 determines that the general location corresponds to the enterprise and the identity of the enterprise is determined (e.g., the enterprise 105), the PSAP 150 determines whether the identified enterprise has a pre-arranged agreement with the emergency services organization associated with the PSAP 150. If no pre-arranged agreement is in place with the identified enterprise, the PSAP 150 may forward the general location to the appropriate emergency services department for the corresponding emergency services to be dispatched. However, if a pre-arranged agreement is in place, the PSAP 150 may contact the enterprise 105 using the identified contact mechanism that was previously provided. For example, a specified number may be dialed to establish a voice communication between the PSAP 150 and the enterprise 105. In another example, the PSAP 150 may utilize an automated system that interacts with an automated system of the enterprise 105. Accordingly, a completely autonomous procedure may be performed between the PSAP 150 and the enterprise 105. Therefore, the mechanism according to the exemplary embodiments including operations to be described herein may be performed using a manual operation by the enterprise 105, an automated operation by the enterprise 105, a manual operation by the PSAP 150, an automated operation by the PSAP 150, and any combination thereof.

When the PSAP 150 has established a connection with the enterprise 105 via the selected contact mechanism, the PSAP 150 may pass information to the enterprise 105. Specifically, the PSAP 150 may forward the contact data or selectively choose items in the contact data to be forwarded to the enterprise 105. For example, the signal strength information of connected or discovered networks, the MAC address, the phone number, etc. may be included in the information passed to the enterprise 105. It should be noted that for security purposes, the information exchanged between the enterprise 105 and the PSAP 150 may be encoded (e.g., SHA-2 hashes) or be based on certificates (e.g., public key cryptography using digital signatures).

When the enterprise 105 has received the contact data from the PSAP 150, the enterprise 105 may perform an initial verification that the user device 110 is indeed in the enterprise 105. For example, the general location that was determined by the PSAP 150 may be determined using certain items in the contact data using one locating mechanism but the enterprise 105 may utilize other items in the contact data using another locating mechanism. The result determined by the enterprise 105 may be different from the general location determined by the PSAP 150. The enterprise 105 may therefore update the PSAP 150 to indicate that the general location does not correspond to the enterprise 105 and the user device 110 is unlikely to be in the enterprise 105. Another reason for verification is described in further detail below with regard to multiple enterprises in the general location. However, if the enterprise 105 verifies that the user device 110 is in the enterprise 105 using the contact data, the enterprise 105 may continue to perform subsequent operations.

Once verified, the enterprise 105 may determine the precise location of the user device 110 within the enterprise 105. Specifically, the enterprise 105 may utilize a variety of different locating mechanisms in determining the precise location. For example, although signal strengths and identities of networks that are discovered may provide a general location, the enterprise 105 may have more accurate details about discoverable networks in the enterprise 105 along with associated signal strengths at different positions in the enterprise 105. Accordingly, the enterprise 105 may be capable of determining the precise location of the user device 110 within the enterprise 105. In another example, the user device 110 may be connected to the WiFi network 120 such that the MAC address of the user device 110 and the phone number of the user device 110 may be stored by the access point 115. Thus, if the contact data includes the MAC address and/or the phone number of the user device 110, the precise location of the user device 110 may be determined.

When the WiFi network 120 includes an arrangement of WiFi networks 120A-F and each WiFi network 120A-F includes an arrangement of WiFi networks 120A-1 to 120A-5, the enterprise 105 may determine the precise location using this information as well. The user device 110 may discover the WiFi network 120 and may also have information about the constituent components of the WiFi network 120. The PSAP 150 may generally identify the WiFi network 120. However, the enterprise 105 may utilize the constituent components of the WiFi network 120 to more accurately identify the position of the user device 110 to determine the precise location. For example, the building within a campus and the floor within the building may be identified for the user device 110. In a specific embodiment, the discovered constituent components of the WiFi network 120 may have known or predetermined ranges of signal strengths associated with the different floors of the building. Thus, on a first floor, the WiFi network 120A-1 may have a first strength range, the WiFi network 120A-2 may have a second strength range, the WiFi network 120A-3 may have a third strength range, the WiFi network 120A-4 may have a fourth strength range, and the WiFi network 120A-5 may have a fifth strength range. A closer proximity of a floor to the constituent component may have an increased value for the range while a floor further from the constituent component may have a lower value for the range. The signal strength values measured by the user device 110 may therefore be used to determine an estimate of a floor using the ranges.

When the enterprise 105 has identified the precise location of the user device 110, the enterprise 105 may perform further operations. In a first example, the enterprise 105 may update the PSAP 150. By updating the PSAP 150 with the precise location of the user device 110, the emergency services that are dispatched will be aware of where within the enterprise 105 to locate the user utilizing the user device 110. In a second example, the enterprise 105 may notify security or another department to provide preliminary emergency services or prepare for the arrival of the emergency services to further expedite the emergency services to reach the user utilizing the user device 110.

The above describes general examples of how the enterprise 105 may determine the precise location of the user device 110 within the enterprise 105. The exemplary embodiments may incorporate a variety of different mechanisms and strategies to determine the precise location. Specifically, the exemplary embodiments may utilize different components disposed throughout the enterprise 105 to determine the precise location. The exemplary embodiments may also utilize different operations using available data to determine the precise location.

In a first example, the signal strengths of the constituent WiFi networks may be used to determine the precise location of the user device 110. With regard to the above description in which the two-dimensional area of the enterprise 105 is substantially similar to a campus as illustrated in FIG. 2 and each building in the campus may be substantially similar to the building illustrated in FIG. 3, the user device 110 may be identified through signal strengths of the constituent WiFi networks 120. Specifically, the two-dimensional component of the precise location may be determined using signal strengths of the WiFi networks 120A-F while the three-dimensional component of the precise location may be determined using signal strengths of the WiFi networks 120A-1 to 120A-5. In a particular example, the user device 110 may be located on floor 330 of the building 205. It may be assumed that the user device 110 is not connected to the WiFi network 120 but is capable of discovering the WiFi network 120 and its constituent networks. The contact data received from the PSAP 150 may have indicated signal strengths to the WiFi networks 120A-F. The signal strengths to the WiFi networks 120D-F may be significantly weak or may not even register with the user device 110. However, the WiFi networks 120B and 120C may have signal strengths that are moderately strong with the user device 110. The WiFi network 120A may have a signal strength that is significantly strong with the user device 110. In this manner, the enterprise 105 may determine that the user device 110 may be in the zone around or in the building 205. Although a simplified example, the enterprise 105 may also use triangulations and other locating mechanisms with the signal strengths to identify the two-dimensional component of the precise location. The contact data may have also included signal strengths associated with the WiFi networks 120A-1 to 120A-5 further indicating that the user device 110 is likely in the building 205. The signal strengths of the WiFi networks 120A-1 to 120A-5 may narrow the search parameters as to which floor the user device 110 is located. Through further refinement, the enterprise 105 may ultimately determine that the user device is on floor 330 (e.g., a relatively weak signal strength of WiFi network 120A-1, a moderate signal strength of WiFi network 120A-2, and a strong signal strength of WiFi network 120A-3).

In a second example, the user device 110 may have performed an associated procedure and connected to the WiFi network 120. When connected to the WiFi network, the user device 110 may have provided its MAC address to the access point 115 as well as a phone number that pairs with the MAC address. The contact data may have included the phone number of the user device 110. Thus, the enterprise 105 need only check its data repositories associated with connections between the WiFi network 120 and user devices to determine if the user device 110 is among the user devices.

In a third example, the enterprise 105 may utilize various NFC components that are distributed throughout the enterprise 105. For example, the NFC components may be NFC tags, radio frequency identification (RFID) tags, beacons, BlueTooth transceivers, etc. In another example, the NFC components may be sensors that detect the presence of user devices. The NFC components may be configured to exchange data with the user device 110 including identifying information. Accordingly, a real time update of interactions with the NFC components may enable the enterprise to track the precise location of the user device 110 while within the enterprise 105.

In a fourth example, a combination of the above mechanisms may be used. For example, the signal strengths may provide a first analysis with the MAC address/phone number confirming that the user device 110 is indeed within the enterprise 105. The NFC components may further determine or verify the precise location of the user device 110.

It should be noted that the above description of the enterprise 105 relates to a single enterprise in a given general location. However, the exemplary embodiments may also be modified when multiple enterprises exist in the general location. For example, although represented as a campus, the general location may be at a periphery of the campus or within the campus where other enterprises may be established. In another example, a building where multiple enterprises are located on respective floors may entail a plurality of enterprises existing in the general location. Accordingly, the exemplary embodiment may be configured to address this scenario as well. Specifically, the verification step described above in which the enterprise 105 verifies that the user device 110 is indeed within the enterprise 105 may remedy this scenario. That is, the PSAP 150 may pass the information to each of the enterprises 105 determined to be in the general location (and having the pre-arranged agreement with the PSAP 150). Thus, although multiple enterprises 105 may be in a general location, the enterprises may return an indication that the user device 110 is not therein while another enterprise may verify that the user device 110 is therein to the PSAP 150.

It should be noted that the above noted location application 420 being an application (e.g., a program) executed by the processor 405 is only exemplary. The functionality associated with the location application 420 may also be represented as components of one or more multifunctional programs, a separate incorporated component of the emergency server 130 or may be a modular component coupled to the emergency server 130, e.g., an integrated circuit with or without firmware.

Figure 5:
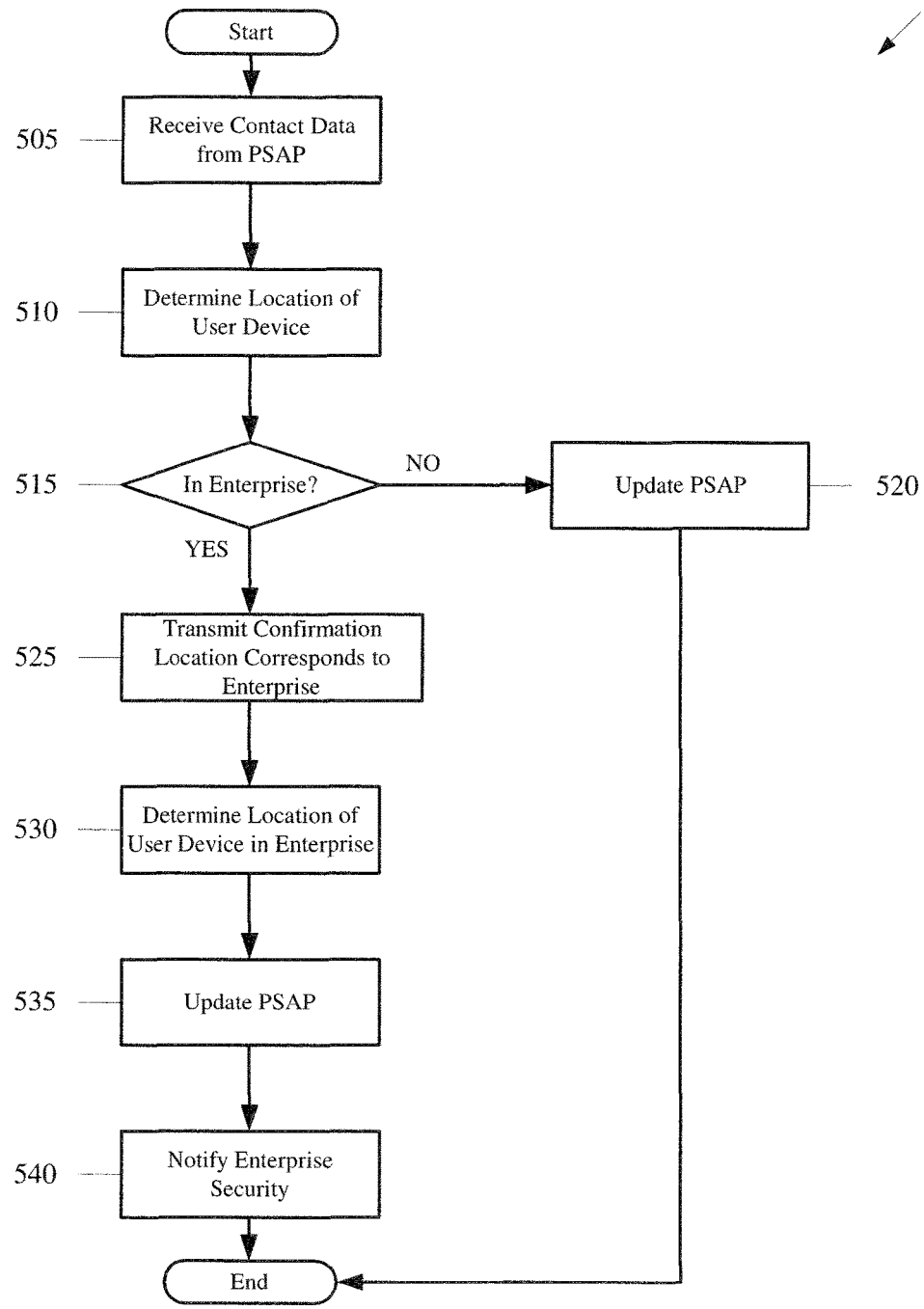
FIG. 5 shows an exemplary method performed by the emergency server of the enterprise of the system of FIG. 1 according to the present disclosure.

FIG. 5 shows an exemplary embodiment of a method 500 performed by the emergency server 130 of the enterprise 105 of the system 100 of FIG. 1 according to the present disclosure. Specifically, the method 500 may relate to operations of the emergency server 130 interacting with the PSAP 150 when the user device 110 has performed an emergency communication with the PSAP 150. In particular, the location application 420 of he emergency server 130 may be utilized in performing the method 500. However, the operations performed by the emergency server 130 in the method 500 will be referred to with the enterprise 105. The method 500 will be described with regard to the system 100 of FIG. 1, the enterprise 105 illustrated in FIGS. 2 and 3, and the emergency server 105 of FIG. 4.

The method 500 may assume several preliminary operations that are performed prior to performance of the method 500. In a first example, the enterprise 105 may be assumed to have a pre-arranged agreement with the PSAP 150. In another example, it may be assumed that the user device 110 has performed the emergency communication with the PSAP 150. In a further example, it may be assumed that the PSAP 150 has received the contact data from the user device 110 and/or the provider of networks connected or discovered by the user device 110. In yet another example, it may be assumed that the PSAP 150 has determined that the enterprise 105 corresponds to a general location determined using the contact data and has connected with the enterprise 105 using the selected contact mechanism provided by the enterprise 105.

In step 505, the enterprise 105 receives the contact data from the PSAP 150. Specifically, the contact data may be received via the selected contact mechanism being used by the PSAP 150 to connect with the enterprise 105. It should be noted that the PSAP 150 may utilize another communication channel for the contact data to be provided. For example, the selected contact mechanism may be a voice call for the PSAP 150 to reach the enterprise 105. The contact data may be forwarded using a different communication channel such as email or using an automated system of the PSAP 150. As described above, the contact data may include various different types of information. For example, the contact data may include location information (e.g., a determined location, signal strength information, connected networks, discovered networks, etc.) and/or information of the user and/or the user device 110.

In step 510, the enterprise 105 determines the location of the user device 110. As noted above, the PSAP 150 may determine the general location of the user device 110 and determine that the enterprise 105 is within the general location. Accordingly, the enterprise 105 may have been contacted. The enterprise 105 may verify whether the contact data indeed identifies the user device 110 to be in the enterprise 105. The enterprise 105 may utilize a variety of mechanisms to determine whether the user device 110 is in the enterprise. For example, the enterprise 105 may perform an independent location determination as to whether the general location of the user device 110 coincides with the enterprise. In another example, other information such as the MAC address may be used if the user device 110 has connected to the WiFi network 120.

In step 515, the enterprise 105 verifies whether the user device 110 is in the enterprise 105 from the location determined in step 510. If the enterprise 105 determines that the user device 110 is not in the enterprise 105, the enterprise 105 continues the method 500 to step 520. In step 520, the enterprise 105 updates the PSAP 150 with an indication that the user device 110 is not in the enterprise 105. However, if the enterprise 105 confirms that the user device 110 is in the enterprise 105, the enterprise 105 continues the method 500 to step 525. In step 530, the enterprise 105 transmits a confirmation to the PSAP 150 that the general location indeed corresponds to the enterprise 105.

In step 530, the enterprise 105 determines the precise location of the user device 110. As described above, the precise location of the user device 110 within the enterprise 105 may be performed using a variety of different location mechanisms. For example, signal strengths of connected or discovered networks may be used to determine the two-dimensional and three-dimensional components of the precise location. In another example, information provided during an association procedure with a specific access point may indicate the precise location. In a further example, components such as NFC components may be used in identifying or narrowing the possible locations that the user device 110 may be located.

Once the precise location of the user device 110 is determined, the enterprise 105 may perform subsequent operations. For example, in step 535, the enterprise 105 updates the PSAP 150 with the precise location of the user device 110. In another example, in step 540, the enterprise 105 notifies security or another department of the emergency communication being performed by the user device 110 at the precise location of the enterprise 105. Thus, when the emergency services arrive at the enterprise 105, the enterprise 105 is prepared to receive the emergency services.

Figure 6:
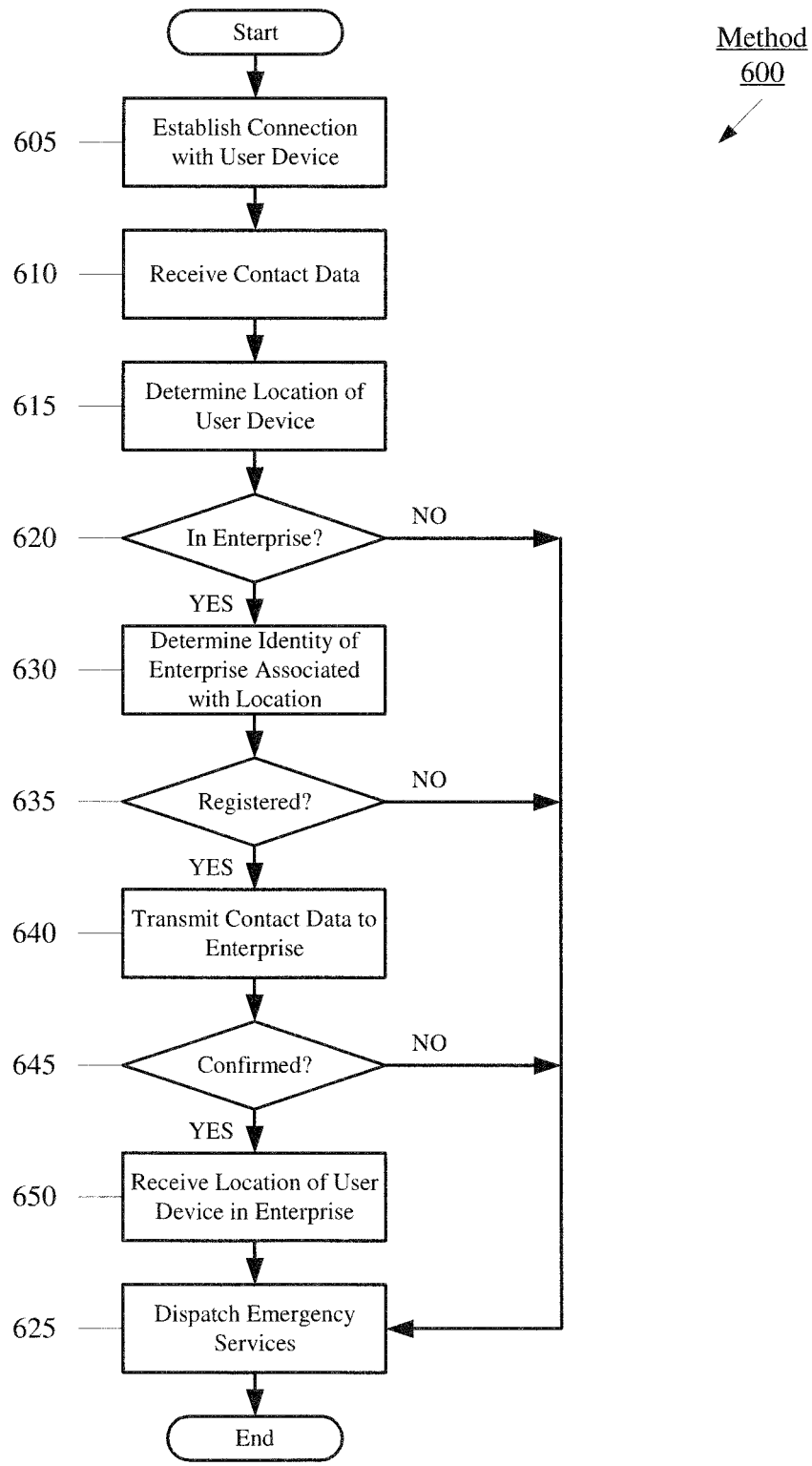
FIG. 6 shows an exemplary method performed by an emergency services entity according to the present disclosure.

FIG. 6 shows an exemplary embodiment of a method 600 performed by the PSAP 150 according to the present disclosure. Specifically, the method 600 may relate to operations of the PSAP 150 interacting with the enterprise 105 when the user device 110 has performed an emergency communication while in the enterprise 105. The method 600 will be described with regard to the system 100 of FIG. 1 and the enterprise 105 illustrated in FIGS. 2 and 3.

The method 600 may assume several preliminary operations that are performed prior to performance of the method 600. In a first example, the enterprise 105 may be assumed to have a pre-arranged agreement with the PSAP 150. In another example, it may be assumed that the user device 110 has attempted to perform the emergency communication.

In step 605, the PSAP 150 establishes a connection with the user device 110 performing the emergency communication. As described above, there may be a plurality of PSAP contact centers where each PSAP contact center is responsible for a given geographic location. The PSAP 150 may correspond to the geographic location including the enterprise 105 which is where the user of the user device 110 is located.

In step 610, the PSAP 150 receives the contact data. As described above, the contact data may include various different types of information such as location related information and/or information of the user and/or the user device 110. The PSAP 150 may receive the contact data from a variety of sources including the user device 110 and/or providers of networks connected to or discovered by the user device 110.

In step 615, the PSAP 150 determines the general location of the user device 110. Specifically, the two-dimensional location of the user device 110 may be determined. As described above, various location mechanisms may be used in determined the general location including known cellular and WiFi networks discoverable in various locations, triangulation, global positioning, etc. Using map data, the PSAP 150 may determine the general location.

In step 620, the PSAP 150 determines whether the general location of the user device 110 corresponds to an enterprise. As described above, the PSAP 150 may have map identification data that indicates an identity of the area in the map data. Thus, the PSAP 150 may determine if the general location corresponds to a residence, a public zone, an enterprise, etc. If the general location does not correspond to an enterprise, the PSAP 150 continues the method 600 to step 625. In step 625, the PSAP 150 dispatches the emergency services based upon the general location only.

However, if the general location corresponds to an enterprise, the PSAP 150 continues the method 600 from step 620 to step 630. In step 630, the PSAP 150 determines the identity of the enterprise 105 that is located in the general location. More specifically, the PSAP 150 may determine the one or more identities of the enterprises that may be at the general location. In step 635, the PSAP 150 determines whether the identity of the identified enterprise 105 corresponds to one that is registered or has the pre-arranged agreement with the PSAP 150. If the enterprise 105 is not registered (or none of the identified enterprises in the general location are not registered), the PSAP 150 continues the method to step 625. Thus, the PSAP 150 dispatches the emergency services based upon the general location.

However, if the enterprise 105 is registered (or at least one of the identified enterprises are registered), the PSAP 150 continues the method 600 from step 635 to step 640. In step 640, the PSAP 150 connects to the enterprise 105 using the contact mechanism previously selected by the enterprise 105 and transmits the contact data. As noted above, the contact data may correspond exactly to or be generated based upon the contact data received previously. Particular types of information in the contact data or the contact data in general may be encrypted or hashed for security purposes.

In step 645, the enterprise 105 receives a response from the enterprise 105 of whether the user device 110 is indeed within the enterprise 105. As described above, the enterprise 105 may confirm or verify that the user device 110 is within the enterprise 105. This confirmation may particularly be relevant when multiple enterprises are present at the general location. Thus, if the enterprise 105 does not confirm but in fact indicates that the user device 110 is not within the enterprise 105, the PSAP 150 continues the method 600 to step 625. Thus, the PSAP 150 dispatches the emergency services based upon the general location.

However, if the enterprise 105 confirms that the user device 110 is within the enterprise 105, the PSAP 150 continues the method 600 from step 645 to step 650. In step 650, the PSAP 150 receives the precise location of the user device 110 from the enterprise 105. As described above, an operation performed by the enterprise 105 is to determine the precise location using a variety of different mechanisms. The enterprise 105 may provide the precise location to the enterprise 105. Thus, in step 625, the PSAP 150 dispatches the appropriate emergency services based upon the general location and the precise location. It is noted that the dispatching of the emergency services does not need to wait for the precise location to be provided. That is, the above ordering is only exemplary. In another example, the emergency services may be dispatched upon connecting with the user device 110 and determining the general location. The precise location may subsequently be transmitted to the dispatched emergency services.

The exemplary embodiments provide a device, system, and method for providing emergency services to a location of a user utilizing a user device performing an emergency communication with a PSAP within a boundary of an enterprise. The exemplary embodiments provide a mechanism in which a pre-arranged agreement between the enterprise and the PSAP enables a subsequent contact to be made therebetween when the emergency communication is made and the enterprise has been identified. With the enterprise determining a precise location of the user device within the enterprise, the emergency services may be dispatched with an improved accuracy and efficiency.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    establishing a communication channel between a transceiver of an enterprise server of an enterprise and an emergency services device;
    receiving, by the transceiver, contact data from the emergency services device over the communication channel, the received contact data comprising location data indicating a first location of a user device and identification data of the user device;
    determining, by the enterprise server, that the first location of the user device includes an area of the enterprise; and
    responsively, determining, by the enterprise server, a second location of the user device, wherein the second location comprises a location within the area of the enterprise that is more precise than the first location, based on the identification data by using the transceiver to determine where, on a wireless network at the area of the enterprise, a device having the identification data is located; and
    transferring the second location to the emergency services device over the communication channel.

2. The method of claim 1, further comprising:
    determining, by the enterprise server, enterprise location data of the user device based on data received from near field communications (NFC) components distributed in the area of the enterprise,
    wherein the determining the second location of the user device is further based on the enterprise location data.

3. The method of claim 1, further comprising:
    transmitting, by the enterprise server, a notification to a security device of the enterprise, the notification being indicative of the received request of the emergency services device.

4. The method of claim 1, wherein the identification data comprises a media access control (MAC) address of the user device, a phone number associated with the user device, or a combination thereof.

5. The method of claim 1, wherein the location data comprises identities of networks that the user device has discovered and signal strengths corresponding to the discovered networks.

6. The method of claim 5, wherein determining the second location comprises:
    determining that the signal strengths of the discovered networks fall within predetermined ranges of signal strengths; and
    identifying a floor of a plurality of building floors, which comprise the area of the enterprise, that corresponds to the predetermined ranges of the signal strengths, wherein the second location comprises the floor.

7. An enterprise server of an enterprise, comprising:
    a transceiver configured to communicate with an emergency services device over a communication channel established with the emergency services device;
    a memory arrangement; and
    a processor coupled to the transceiver and the memory arrangement,
    wherein the processor is configured to instruct the transceiver to receive contact data from the emergency services device over the communication channel, the received contact data comprising location data indicating a first location of a user device and identification data of the user device,
    wherein the processor is configured to determine that the first location of the user device includes an area of the enterprise,
    wherein the processor is configured to responsively determine a second location of the user device, wherein the second location comprises a location within the area of the enterprise, based on the identification data by using the transceiver to determine where, on a wireless network at the area of the enterprise, a device having the identification data is located; and
    wherein the processor is configured to instruct the transceiver to transmit the second location to the emergency services device over the communication channel.

8. The emergency server of claim 7, wherein the processor is further configured to instruct the transceiver to receive data from near field communications (NFC) components distributed in the area of the enterprise, wherein the processor is further configured to determine enterprise location data of the user device based on the data from the NFC components, and wherein the determining the second location of the user device is further based on the enterprise location data.

9. The emergency server of claim 7, wherein the processor is further configured to instruct the transceiver to transmit a notification to a security device of the enterprise, the notification being indicative of the received request of the emergency services device.

10. The emergency server of claim 7, wherein the identification data comprises a media access control (MAC) address of the user device, a phone number associated with the user device, or a combination thereof.

11. The emergency server of claim 7, wherein the location data comprises identities of networks that the user device has discovered and signal strengths corresponding to the discovered networks.

12. The emergency server of claim 11, wherein to determine the second location, the processor is configured to:
    determine that the signal strengths of the discovered networks fall within predetermined ranges of signal strengths; and
    identify a floor of a plurality of building floors, which comprise the area of the enterprise, that corresponds to the predetermined ranges of the signal strengths, wherein the second location comprises the floor.

13. A method, comprising:
    establishing a communication channel between a transceiver of an enterprise server of an enterprise and an emergency services device;
    receiving, by the emergency services device, contact data, the received contact data comprising location related data of the user device and identification data of the user device;

determining, by the emergency services device, a general location data indicating a first location of the user device based on the contact data;

determining, by the emergency services device, an identity of an enterprise located at the first location based on the general location data;

transmitting, by the emergency services device, the contact data and a request for a second location to the transceiver over the communication channel associated with the enterprise, the second location comprising a location of the user device within the area of the enterprise that is more precise than the first location, wherein the enterprise server uses the transceiver to determine where, on a wireless network at the area of the enterprise, a device having the identification data is located; and receiving, by the emergency services device, the second location from the enterprise server over the communication channel.

14. The method of claim 13, further comprising:
prior to receiving the contact data:
performing, by the emergency services device, a registration process for the enterprise device to register with the emergency services device, wherein the registration process includes the emergency services device receiving information about the enterprise and a contact mechanism for the emergency services device to contact the enterprise device.

15. The method of claim 13, wherein the identification data comprises a media access control (MAC) address of the user device, a phone number associated with the user device, or a combination thereof.

16. The method of claim 13, wherein the location data comprises identities of networks that the user device has discovered and signal strengths corresponding to the discovered networks.

* * * * *